(12) United States Patent
James (10) Patent No.: US 12,060,150 B2
(45) Date of Patent: Aug. 13, 2024

(54) MULTIROTOR AIRCRAFT AND INTERFACE DEVICE

(71) Applicant: Saronikos Trading and Services, Unipessoal LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 188 days.

(21) Appl. No.: 16/638,991

(22) PCT Filed: Aug. 15, 2017

(86) PCT No.: PCT/IB2017/054957
§ 371 (c)(1),
(2) Date: Feb. 13, 2020

(87) PCT Pub. No.: WO2019/034907
PCT Pub. Date: Feb. 21, 2019

(65) Prior Publication Data
US 2020/0369383 A1    Nov. 26, 2020

(51) Int. Cl.
*B64C 39/02* (2023.01)
*B64D 47/08* (2006.01)
(Continued)

(52) U.S. Cl.
CPC ............ *B64C 39/024* (2013.01); *B64D 47/08* (2013.01); *G05D 1/0038* (2013.01); *B64U 50/00* (2023.01);
(Continued)

(58) Field of Classification Search
CPC .......... B64C 39/0024; B64C 2201/123; B64C 2201/146; B64C 2201/16; B64D 47/08; G05D 1/0038
See application file for complete search history.

(56) References Cited

U.S. PATENT DOCUMENTS 9,471,059 B1 * 10/2016 Wilkins ................. B64D 47/08
9,738,380 B2 * 8/2017 Claridge .............. H04B 1/3833
(Continued)

FOREIGN PATENT DOCUMENTS

CN    104580606 A    *    4/2015
CN    104890875 A    *    9/2015
(Continued)

OTHER PUBLICATIONS

Loctite North America, "Loctite Gel Control Super Glue", Aug. 2012, Loctite North America via Youtube. https://www.youtube.com/watch?v=CGJ3WUsk2EI (Year: 2012).*
(Continued)

*Primary Examiner* — Hussein Elchanti
*Assistant Examiner* — Kenneth M Dunne
(74) *Attorney, Agent, or Firm* — Workman Nydegger (57) ABSTRACT

A remotely controlled multirotor aircraft for acquiring images and an interface device for controlling the aircraft, wherein the aircraft includes a receiving component adapted to receive a direction and/or orientation signal which can be transmitted by an interface device, wherein the direction and/or orientation signal defines a direction in which the aircraft must move and/or be oriented, and a flight control component adapted to control the attitude of the aircraft and configured for reading the direction and/or orientation signal, determining, on the basis of the direction and/or orientation signal, the direction in which the aircraft must move and/or be oriented, and generating a control signal adapted to make the aircraft take an attitude such as to make it move and/or be oriented in the predetermined direction.

18 Claims, 6 Drawing Sheets

(51) Int. Cl.
　　　*B64U 50/00*　　　(2023.01)
　　　*B64U 101/30*　　(2023.01)
　　　*G05D 1/00*　　　(2024.01)

(52) U.S. Cl.
　　　CPC ...... *B64U 2101/30* (2023.01); *B64U 2201/20* (2023.01)

(56) References Cited

U.S. PATENT DOCUMENTS

| | | | |
|---|---|---|---|
| 11,618,561 | B2 | 4/2023 | James |
| 2011/0204188 | A1 | 8/2011 | Marcus |
| 2013/0058023 | A1* | 3/2013 | Supran ............... G06F 1/1632 361/679.01 |
| 2014/0265765 | A1* | 9/2014 | Khodapanah ......... F16M 11/14 312/223.1 |
| 2014/0297067 | A1 | 10/2014 | Malay |
| 2015/0370250 | A1* | 12/2015 | Bachrach ............... G01C 23/00 701/2 |
| 2016/0161946 | A1* | 6/2016 | Wuth Sepulveda . G05D 1/0022 701/2 |
| 2016/0173742 | A1* | 6/2016 | Hassan Zureikat ... B64C 39/024 348/144 |
| 2016/0272317 | A1* | 9/2016 | Cho ....................... G08G 1/0955 |
| 2016/0286128 | A1* | 9/2016 | Zhou .................... B64C 39/024 |
| 2016/0376004 | A1 | 12/2016 | Claridge |
| 2017/0036771 | A1 | 2/2017 | Woodman et al. |
| 2017/0101178 | A1* | 4/2017 | Lee ....................... B64C 39/024 |
| 2017/0201614 | A1 | 7/2017 | Deng et al. |
| 2017/0217589 | A1 | 8/2017 | Maekawa |
| 2017/0291705 | A1* | 10/2017 | Wang .................... G05D 1/0016 |
| 2017/0305537 | A1* | 10/2017 | Smith ................... B64C 39/024 |
| 2017/0315547 | A1* | 11/2017 | Tsaplin ................ B64C 39/024 |
| 2017/0369164 | A1* | 12/2017 | Klein .................... B64C 39/024 |
| 2018/0022454 | A1* | 1/2018 | Zhang .................. B64C 39/024 701/3 |
| 2018/0046179 | A1* | 2/2018 | Choi .................... B64C 39/024 |
| 2018/0327070 | A1 | 11/2018 | Rahnama |
| 2018/0327092 | A1* | 11/2018 | Deng .................... B64C 39/024 |
| 2019/0028133 | A1 | 1/2019 | Stroppiana |
| 2019/0118972 | A1 | 4/2019 | Yan |

FOREIGN PATENT DOCUMENTS

| | | | | |
|---|---|---|---|---|
| CN | 204956909 | U | * | 1/2016 |
| GB | 2455374 | A | * | 6/2009 ............ B64C 27/00 |
| KR | 101615319 | B1 | * | 4/2016 |
| KR | 20180067345 | A | * | 6/2018 |
| WO | WO-2016141206 | A1 | * | 9/2016 ............ H02J 7/025 |
| WO | 2016/176093 | A1 | | 11/2016 |
| WO | 2017/075965 | A1 | | 5/2017 |
| WO | 2017/132796 | A1 | | 8/2017 |

OTHER PUBLICATIONS

Machine Translation of KR 101615319 B1 (Year: 2016).*
Machine Translations of CN 204956909 U (Year: 2016).*
Machine Translations of CN 104890875 A full text (Year: 2015).*
Machine Translations of CN 104890875 A specification with paragraph numbers (Year: 2015).*
Machine translation of CN 104890875 A with Claim translation (Year: 2015).*
International Search Report dated Apr. 17, 2018, issued in PCT Application No. PCT/IB2017/054957, filed Aug. 15, 2017.
Written Opinion dated May 7, 2018, issued in PCT Application No. PCT/IB2017/054957, filed Aug. 15, 2017.

* cited by examiner

MULTIROTOR AIRCRAFT AND INTERFACE DEVICE

BACKGROUND OF THE INVENTION

1. The Field of the Invention

The present invention relates to a remotely controlled multirotor aircraft for acquiring images (still or moving) and an interface device for controlling said aircraft; in particular, a multirotor aircraft for acquiring images (such as self-portraits, also known as 'selfies') from positions that are difficult to reach by a support according to the prior art (such as a 'selfie stick' or others).

2. The Relevant Technology

As is known, a multirotor aircraft (e.g., a bicopter, a tricopter, a quadcopter, a hexacopter, or the like) is intrinsically unstable, and therefore requires constant adjustment of the speed of the motors to maintain the orientation set by the pilot. Speed control is normally effected by suitable controllers (e.g., proportional, integral and derivative controllers—also known as PIDs, which act in a distinct manner upon each one of the three axes of rotation of the aircraft (also known as axes of roll, pitch and yaw), so as to keep the angular speeds along such axes as close as possible to the values selected by the pilot by actuating a remote control device, such as a remote control, a radio control or others.

The awkward actuation of said remote control device, typical of inexperienced pilots, inevitably results in oscillations of the aircraft and/or vibrations propagating along the frame thereof; such oscillations and/or vibrations make image acquisition difficult, because in certain exposure conditions the photos and/or videos acquired by the video acquisition means may be affected by microblur and/or by the rolling shutter effect (also known as 'Jello').

Several techniques are currently known in the art for reducing the microblur and/or the rolling shutter effect in multirotor aircraft; in particular, such effects can be partially attenuated by mounting the video acquisition means on a support capable of absorbing vibrations (e.g., a support lying on a layer of silicone-based gel). This solution allows absorbing the vibrations of the frame, which are mainly due to stresses (of the order of hundreds kHz) produced by the motors, but cannot compensate for the oscillations of the aircraft, the frequency of which is typically lower (i.e., less than 100 Hz), that are due to the awkward actuation of the remote control device. One solution for reducing the oscillations of the aircraft consists of using a servo-assisted cardan support (also known as 'gimbal'), which can correct the orientation of the video acquisition means when the aircraft is oscillating, e.g., because of the wind and/or of the awkward actuation of the remote control by the user. This solution is not suitable, however, for use on small aircraft, because these servo-assisted cardan supports comprise at least three servomotors (one per axis) and are therefore excessively heavy for use on small aircraft. Moreover, for use by the general public, these types of aircraft must also meet regulations that, in some countries, limit the allowable take-off weight, e.g., to less than 200-250 grams. Therefore, the use of a servo-assisted cardan support is often impossible, if one wants to comply with the weight limits set out in the regulations.

SUMMARY OF THE INVENTION

The present invention aims at solving these and others problems by providing a remotely controlled multirotor aircraft for image acquisition.

Moreover, the present invention aims to at solving these and other problems by providing an interface device for controlling said aircraft.

The idea at the basis of the present invention is to control a remotely controlled multirotor aircraft for acquiring images (still or moving) based on a direction and/or orientation signal that defines the direction (and not the attitude or attitude variation to be made) in which said aircraft must move and/or be oriented (where aircraft orientation also refers to the orientation of the aircraft in a certain static position reached and maintained for a certain period of time by the aircraft once it has been set to fly), where said direction and/or aircraft direction signal is generated by an interface device that can be operated by a user.

Figure 1:
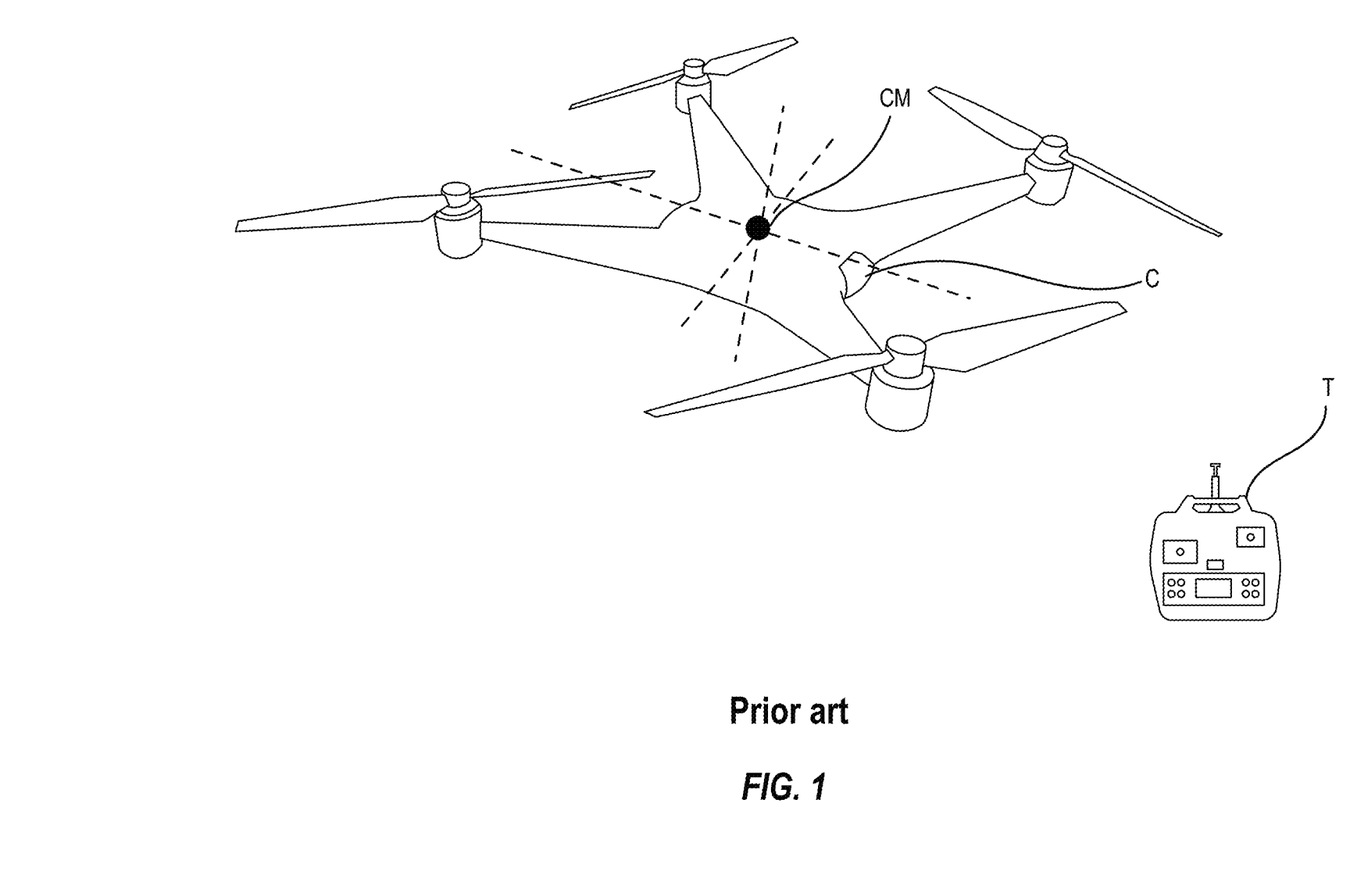
FIG. 1 shows a perspective view of a multirotor aircraft and a remote control device according to the prior art.

In this way, the quality of the images acquired by the video acquisition means is independent of the piloting skills of the user of the aircraft, contrary to what happens with a multirotor aircraft according to the prior art, in which the quality of the images acquired by the video acquisition means is dependent on the pilot's flight control skills, i.e., on the way he/she operates the remote control device T (see FIG. 1) since said video acquisition device (e.g., a camera C shown in FIG. 1) is usually placed at a point along an edge of the frame and, therefore, far from the center of mass (in FIG. 1 indicated with the symbol CM) of the aircraft. In fact, in the case of the multirotor aircraft of FIG. 1, the video camera C is particularly sensitive to pitch movements, because its position away from the center of mass will cause the free oscillations of the aircraft along the axis of pitch to have sufficient amplitude to create problems when shooting photos and/or videos in particular exposure conditions, e.g., when there is a low light level, i.e., when and exposure time needs to be increased in order to attain proper exposure of the object in low-light conditions. It should be noted that the pitching movements are more frequent when trying to find the correct field width to acquire one or more images, since the aircraft must be moved towards or away from the object to be shot by carrying out climbs or descents and, therefore, an awkward actuation of the remote control T would affect the quality of the images acquired, especially if one wants to acquire video while moving the aircraft, for example moving the aircraft, at a constant speed, closer or farther away from the subject to be shot.

Further advantageous features of the present invention will be set out in the appended claims.

BRIEF DESCRIPTION OF THE DRAWINGS

These features as well as further advantages of the present invention will become more apparent from the following description of an embodiment thereof as shown in the accompanying drawings, which are supplied by way of non-limiting example, in which.

DETAILED DESCRIPTION OF THE PREFERRED EMBODIMENTS

Any reference to "an embodiment" in this description will indicate that a particular configuration, structure or feature is comprised in at least one embodiment of the invention. Therefore, the phrase "in an embodiment" and other similar phrases, which may be present in different parts of this description, will not necessarily be all related to the same embodiment. Furthermore, any particular configuration, structure or feature may be combined in one or more embodiments as deemed appropriate. The references below are therefore used only for simplicity's sake and do not limit the protection scope or extent of the various embodiments.

Figure 2:
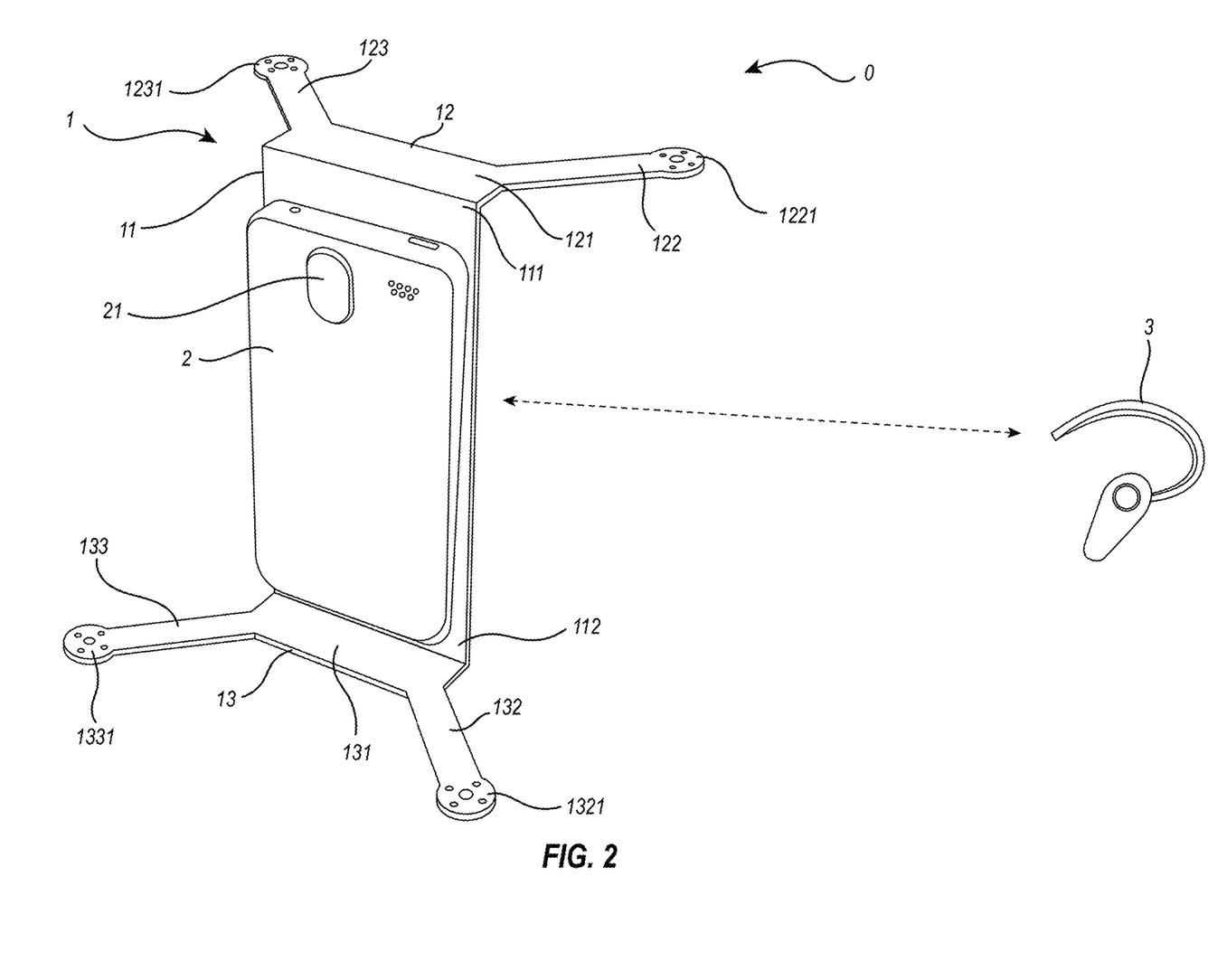
FIG. 2 shows a perspective view of a possible implementation of a multirotor according to the invention and a first embodiment of an interface device according to the invention.

With reference to FIG. 2, a system for the acquisition of aerial imagery comprises a remotely controlled aircraft 0 for acquiring images according to the invention and an interface device 3 for controlling said aircraft according to the invention.

Aircraft 0 comprises the following elements:
receiving means, such as a Bluetooth transceiver (IEEE 802.15.1) adapted to receive a direction and/or orientation signal which can be transmitted by the interface device 3, wherein said direction and/or orientation signal defines a direction and/or an orientation in which said aircraft must move and/or be oriented;
flight control means, such as a PixHawk® model unit produced by 3D Robotics, adapted to control the attitude of said aircraft and that are in signal communication with the receiving means.

More in detail, the flight control means are configured for performing the following steps:
a. reading the direction and/or orientation signal, for example by acquiring said direction and/or orientation signal by one or more communication interfaces;
b. determining, on the basis of said direction and/or orientation signal of the aircraft, the direction in which said aircraft must move and/or be oriented. For example, if the orientation and/or direction signal contains an indication of moving forward, the flight control means will determine the movement preferably in the direction towards which the bow of the aircraft is oriented or, in a second piloting mode that might make it easier to control the aircraft, in the direction that radially moves the aircraft towards the point where the user is irrespective of the current orientation of the bow of the aircraft; in this second piloting mode, the command to move forward might preferably be translated into "come here";
c. generating a control signal adapted to make said aircraft take an attitude such as to make it move and/or be oriented in the predetermined direction, for example by setting an inclination along a certain axis that aircraft 0 must maintain for some time.

The interface device 3, which in this variant can take the shape of an earphone/microphone for a mobile phone, comprises the following parts:

sensor means, such as audio acquisition means, adapted to generate an instruction signal based on an interaction with a user of said aircraft;
transmission means, such as a Bluetooth (IEEE 802.15.1) and/or WiFi (IEEE 802.11) transceiver, adapted to transmit to said aircraft the direction and/or orientation signal that, as mentioned above, defines a direction in which said aircraft must move;
processing means, such as one or more CPUs, one or more microcontrollers or others, in signal communication with the sensor means and the transmission means.

More in detail, the processing means are configured for performing the following steps:
a. reading the instruction signal;
b. generating the orientation and/or direction signal on the basis of said instruction signal;
c. transmitting, by means of the transmission means, the direction and/or orientation signal to said aircraft.

In this way, aircraft 0 may be controlled without using a remote control according to the prior art, thereby advantageously reducing the aircraft vibrations/oscillation and making the quality of the images acquired by the video acquisition means independent of the piloting skills of the user of said aircraft.

In this embodiment, the instruction signal represents a voice command (such as "forward", "backward", "right", "left", "stop" or "rotate left" and "rotate right", "slip left", "slip right" or others) imparted by the user of said aircraft; this voice command is preferably encoded in a digital audio encoding format (such as WAV, MP3 or others) so that it can be treated by the digital processing means.

The direction and/or orientation signal generation based on the instruction signal can be performed by encapsulating the instruction signal in a sequence of packets which constitutes the direction and/or orientation signal. In other words, the processing means of the interface device 3 are configured for generating the direction and/or orientation signal by encapsulating at least the instruction signal (which contains the voice command imparted by the user of said aircraft) in at least one data packet.

In this case, the flight control means of aircraft 0 determine the direction in which said aircraft must move by executing a sequence of instructions that implement a speech recognition algorithm, so as to convert the voice command represented by the instruction signal (encapsulated in the direction and/or orientation signal) into a textual or other type of command which may be associated with a specific movement that the aircraft will have to make.

Figure 3:
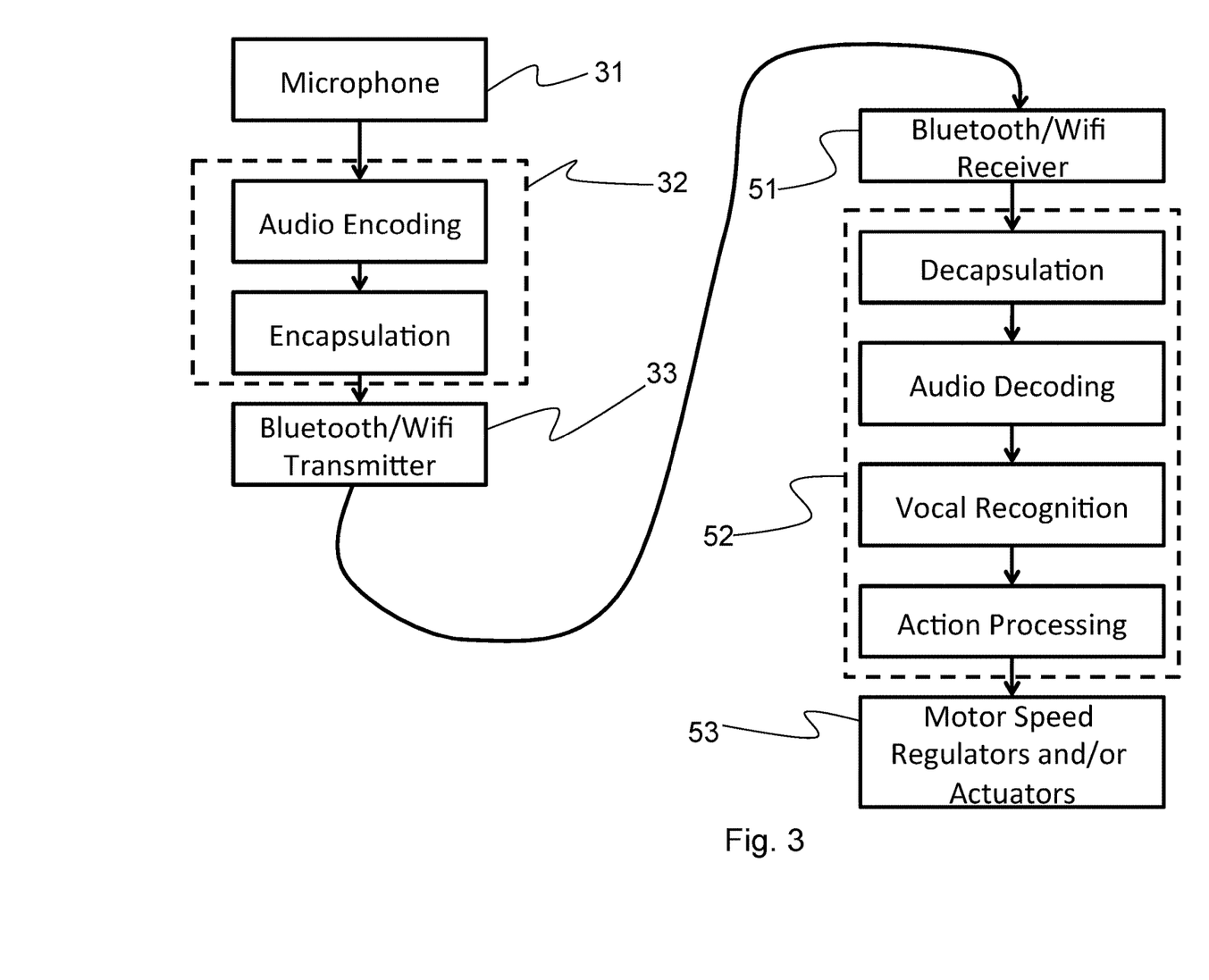
FIG. 3 shows a block diagram showing the operation of a first preferred embodiment of the various parts of the invention.

With reference also to FIG. 3, the operation of this embodiment of the invention will now be described. When aircraft 0 and the interface device 3 according to this variant are in an operating condition, the sensor means 31 (which for example comprise a microphone) acquire an audio signal which is then processed by the processing means 32 comprised in said device 3. In particular, the processing means 32 encode the audio signal acquired by the microphone, encapsulate the encoded audio signal in one or more data packets and transmit said data packets to aircraft 0 by means of the transmission means 33. After that, the receiving means 51 receive the data packets transmitted by the transmission means 33. Thereafter, the flight control means 52 decapsulate said data packets, thereby reconstructing the encoded audio signal, decode said audio signal, recognize the voice command contained in said audio signal (through a speech recognition algorithm) and process the voice command, thereby generating control signals on the basis of said voice command. Finally, these control signals are transmitted to the speed controllers and/or actuators 53 that are capable of varying the attitude of the aircraft 0. In other words, the flight control means 52 may be configured for performing the following operations:

- executing a sequence of instructions that implements a speech recognition algorithm that converts the voice command represented in the instruction signal into a bit string;
- generating the control signals on the basis of said bit string.

As an alternative to what has just been described above, the processing means of the interface device 3 may be configured for performing a sequence of instructions that implements a speech recognition algorithm so as to convert the voice command represented by the instruction signal into a textual or other type of command, which may be encoded in the orientation and/or direction signal in an advantageously more efficient manner in space and time, for example the voice commands may be transformed into text strings that are decoded by the flight control means by means of an association table and transformed into control signals suitable for moving aircraft 0 in the direction and/or orientation desired by the user of said aircraft 0. In other words, the processing means 32 of the interface device 3 may be configured for performing the following operations:

- executing a sequence of instructions that implements a speech recognition algorithm that converts the voice command represented in the instruction signal into a bit string;
- generating the direction and/or orientation signal by encoding at least said bit string into said direction and/or orientation signal.

Figure 4:
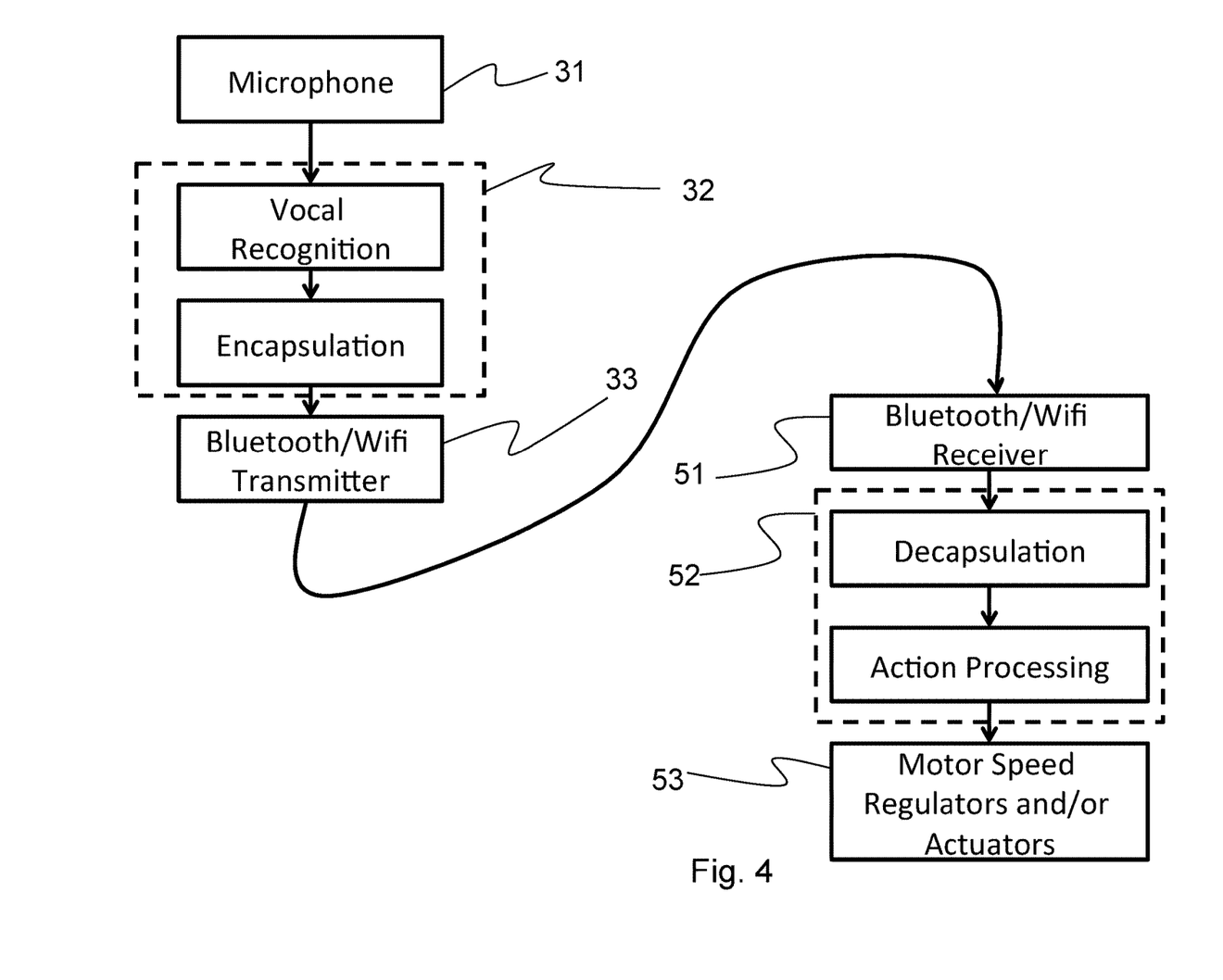
FIG. 4 shows a block diagram showing the operation of a second preferred embodiment of the various parts of the invention.

With reference to FIG. 4, the operation of this particular variant will now be described. When aircraft 0 and the interface device 3 according to this variant are in an operating condition, the sensor means 31 (which for example comprise a microphone) acquire an audio signal which is then processed by the processing means 32 comprised in said device 3. In particular, the processing means 32 recognize the voice command contained in said audio signal (through a speech recognition algorithm), generate the orientation and/or direction signal on the basis of said voice command), encapsulate said control commands into one or more data packets and transmit said data packets to aircraft 0 by means of the transmission means 33. After that, the receiving means 51 receive the data packets transmitted by the transmission means 33. Thereafter, the flight control means 52 decapsulate said data packets thereby reconstructing the control command and process the control command thereby generating control signals on the basis of said control command. Finally, these control signals are transmitted to the speed controllers and/or actuators 53 that are capable of varying the attitude of aircraft 0.

A man skilled in the art may use an interface device having an embodiment different from that of an earphone/microphone for a mobile phone, without departing from the teachings of the present invention.

It is also noted that the use of an interface device according to the invention also solves other problems that the aircraft according to the prior art exhibit in some situations; in fact, such aircraft use control techniques based on gesture recognition. These techniques use the image recognition technology and require that the camera mounted on board the aircraft always frames the user of said aircraft, thus considerably limiting the possibilities of use of the aircraft, since said aircraft cannot move away that much from its user and cannot frame objects or people that are not in the frame in which the user is. In addition, if the user is in the midst of other people, the aircraft may have trouble recognizing gestures made by its user and might mistake another person doing appropriate gestures as its rightful owner, also increasing the risk of accidents or theft of the aircraft.

Figure 5:
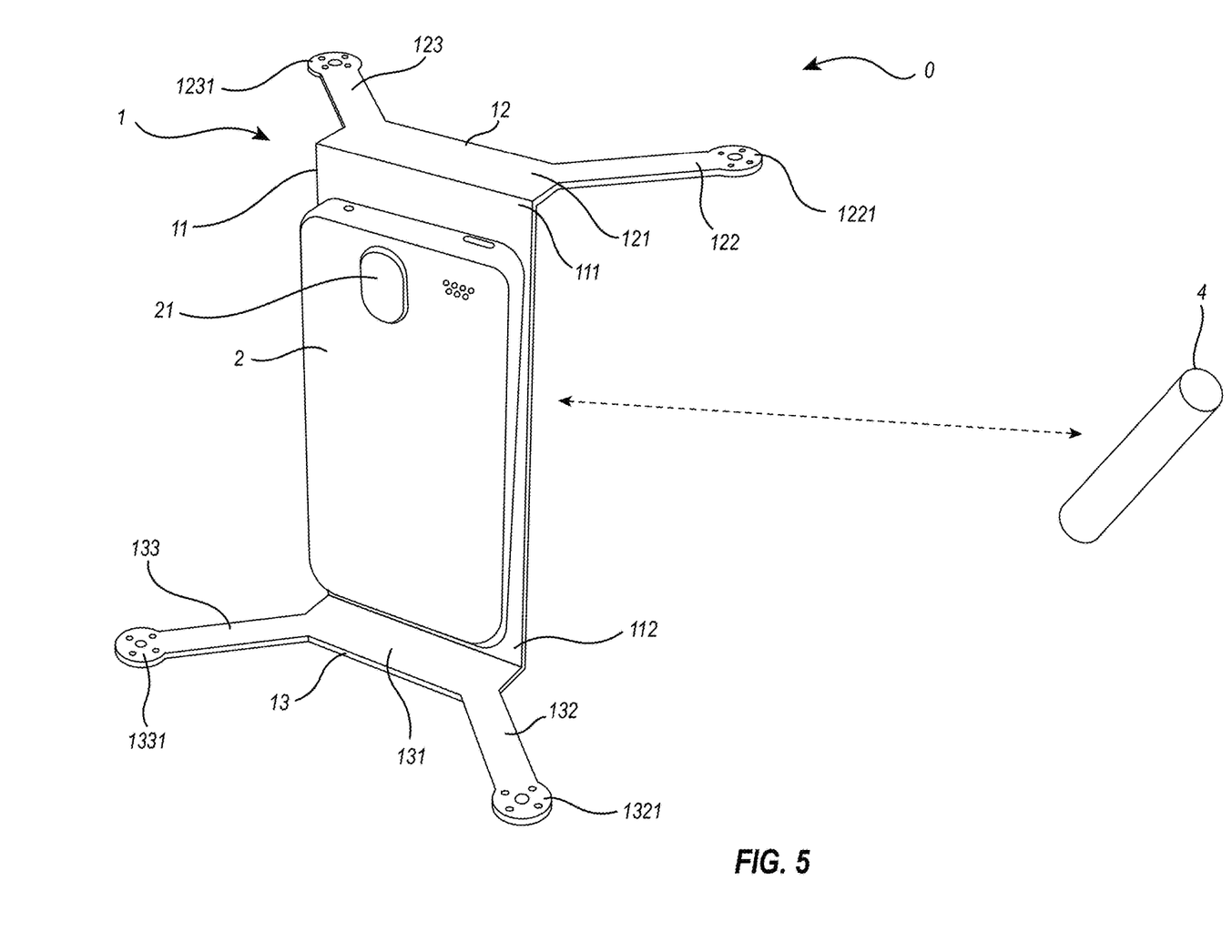
FIG. 5 shows a perspective view of a possible implementation of a multirotor according to the invention and a second embodiment of an interface device according to the invention.

With reference to FIG. 5, an interface device 4 will now be described, which is an alternative to the interface device 3 in the form of an earphone/microphone for a mobile phone.

The interface device 4 preferably has the shape of a wand, but it may also have the shape of a bracelet or any other object that can be used with an upper (human) (or even lower) limb.

In this interface device, the sensor means may comprise a gyroscope and/or an accelerometer and/or a compass and/or a GNSS receiver (e.g., a GPS receiver) and/or other means for acquiring data on position, distances, and orientation, and wherein the instruction signal represents a movement that the user of said aircraft imparts to said interface device 4, such as a forward/backward movement to indicate that the aircraft must move forward/backward, a left/right movement to indicate that the aircraft must move to the left/right, a rotation in the air to indicate that the aircraft must rotate by a certain angle around its vertical axis, and so on.

Similar to the alternative above, the direction and/or orientation signal generation can be performed by encapsulating the instruction signal in a sequence of packets which constitutes the direction and/or orientation signal. In this case, the flight control means of aircraft 0 determine the direction in which said aircraft must move by executing a sequence of instructions that implement a movement recognition algorithm, so as to convert the movement represented by the instruction signal (encapsulated in the direction and/or orientation signal) into a textual or other type of command which may be associated with a specific movement that the aircraft will have to make.

Alternatively, the processing means may be configured to execute a sequence of instructions that implements a movement recognition algorithm, so as to convert the movement represented by the instruction signal in a textual or other type of command, which may be encoded in the orientation and/or direction signal in an advantageously more efficient manner in space and time.

This variant allows the use of aircraft 0 also in noisy environments, or in environments where the interface device 3 described above cannot be used. In this way, aircraft 0 may be controlled without using a remote control in a wider variety of situations, thereby advantageously reducing the aircraft vibrations/oscillation and making the quality of the images acquired by the video acquisition means independent of the piloting skills of the user of said aircraft.

It should be noted that both variants of the interface device 3, 4 may be implemented using a mobile device, such as a smartphone, tablet or others.

Figure 6:
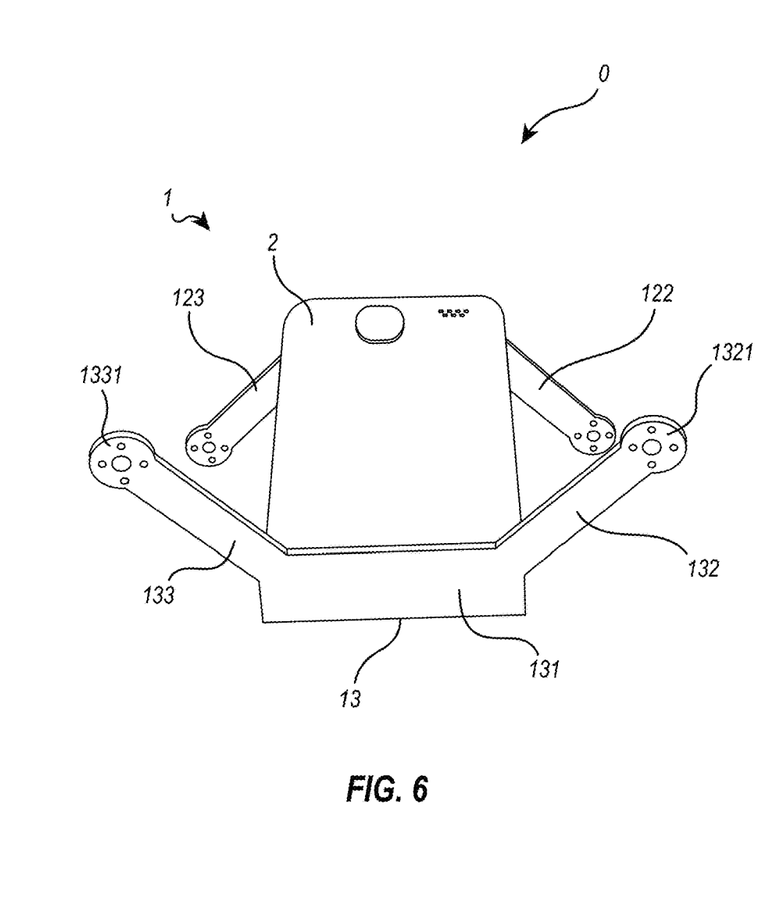
FIGS. 6 and 7 show perspective views of the multirotor aircraft of FIGS. 2 and 5, observed from different viewpoints.
Figure 7:
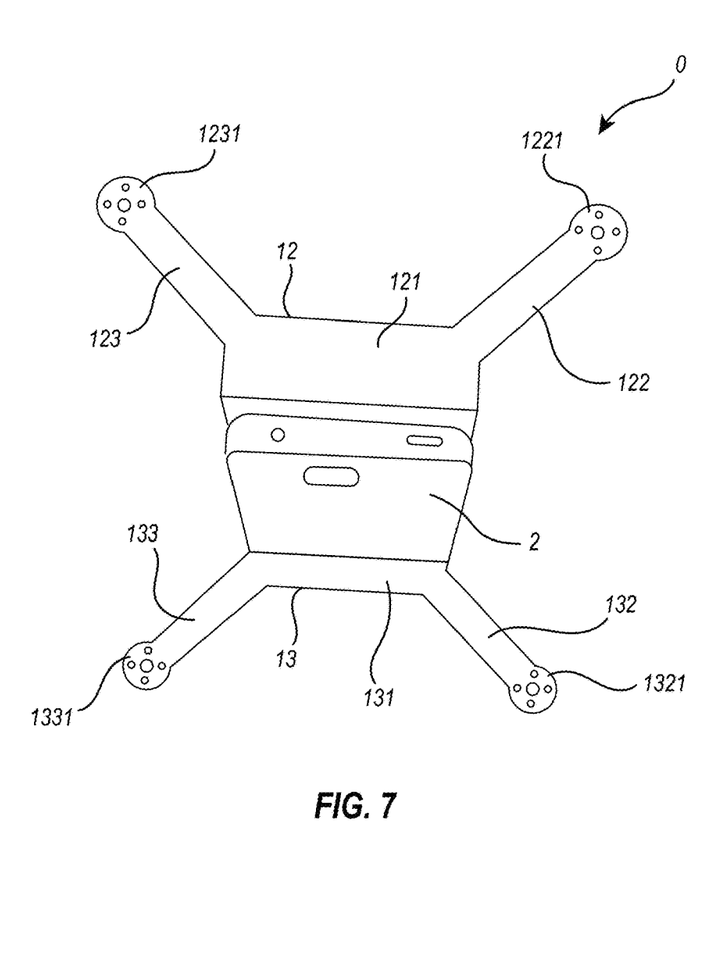

With reference also to FIGS. 6 and 7, the remotely controlled multirotor aircraft 0 comprises a frame 1, where said frame 1 may comprise the following parts:

- a central portion 11 comprising coupling means (not shown in the annexed drawings), adapted to allow the coupling between a mobile device 2 and said frame 1;
- a (first) upper peripheral portion 12, to which at least one motor can be coupled, preferably two motors having similar characteristics and configured for turning in mutually opposite directions of rotation;

a (second) lower peripheral portion 13, to which at least one motor can be coupled, preferably two motors similar to those that can be coupled to the upper peripheral portion, and configured for turning in mutually opposite directions of rotation.

The upper peripheral portion 12 is coupled to a first end 111 of the central portion 11, while the lower peripheral portion 13 is coupled to a second end 112 (preferably opposite to the first end 111) of the central portion 11; therefore, each one of the peripheral portions 12, 13 is coupled to one of the ends 111,112 of said central portion 11, wherein said ends 111, 112 are distinct from each other. Furthermore, said peripheral portions 12, 13 are not coplanar, i.e., the upper peripheral portion 12 develops in a plane that is different from that in which the lower peripheral portion 13 develops; more in detail, such planes are preferably parallel to each other, but are located at different heights relative to a reference plane.

This particular arrangement of the portions 11, 12, 13 of the frame 1 allows the central portion 11 to receive a mobile device (e.g., a smartphone, a tablet, or the like, the shape of which, as is known, is very similar to a parallelepiped) comprising video acquisition means 21 (e.g., a video camera) in a suitable position (i.e., substantially vertical or anyway with a downward or upward angle of 10 to 30 sexagesimal degrees) for exploiting said video acquisition means 21 in order to acquire images in flight; in fact, said video acquisition means 21 comprise a lens that, as is known, looks through a hole formed in the front or back face of said terminal, i.e., one of the two largest faces of the terminal 2.

It must also be pointed out that this particular shape allows keeping the center of mass of the aircraft (which comprises said frame 1) near the central portion 11 of the frame, and hence also near to the video acquisition means 21 of the device 2, thereby reducing the amplitude of the vibrations/oscillations to which said video acquisition means 21 are subjected in flight.

The coupling means comprised in the central portion 11 may comprise a case compatible with the shape of the mobile device 2 and/or one or more magnets suitable for keeping the mobile device 2 coupled to said central portion 11 and/or a layer of bi-adhesive gel (preferably silicone-based gel) attached on one side to the portion 111 and on the other side to one of the surfaces of the mobile device, and/or the like. It must be pointed out that the solution using a layer of gel is also useful to reduce the amount of vibrations that reach the mobile device 2, and hence the video acquisition means 21, when the aircraft comprising the frame 1 described herein is in operation.

The portions 11-13 of the frame 1 are preferably made of composite material (e.g., carbon fiber or fiberglass) or metallic or plastic material.

The central portion 11 may preferably have a parallelepiped shape, the largest faces of which are sufficiently big to allow the coupling of said mobile device 2, whereas the thickness of said central portion 11 may preferably be comprised between 1 mm and 3 mm.

As already described, the upper peripheral portion 12 preferably has a planar development; also, said upper peripheral portion 12 may preferably comprise the following parts:

an upper main part 121 having a parallelepiped or trapezoidal shape or a shape with curved contours, firmly constrained to the central portion 11 and preferably perpendicular to the latter;

a pair of upper arms 122,123 extending from the upper main part 121, preferably in a symmetrical fashion, wherein each one of said upper arms comprises an upper housing 1221, 1231 for at least one motor (not shown in the annexed drawings), preferably of the 11XX or 13XX type, or the like.

Moreover, also the upper peripheral portion 12, just like the central portion 11 (see FIG. 2), preferably has a thickness in the range of 1 mm to 3 mm.

The shape of the lower peripheral portion 13 is preferably similar to that of the upper peripheral portion 12; in fact, also the lower peripheral portion 13 may preferably comprise the following parts:

a lower main part 131 having a parallelepiped or trapezoidal shape or a shape with curved contours, firmly constrained to the central portion 11 and preferably perpendicular to the latter;

a pair of lower arms 132,133 extending from the lower main part 131, preferably in a symmetrical fashion, wherein each one of said arms comprises a lower housing 1321,1331 for at least one motor of a type similar to those used in the upper peripheral portion 12.

Moreover, also the lower peripheral portion 13 preferably has a thickness in the range of 1 mm to 3 mm.

As aforementioned, the portions 11-13 of the frame 1 may preferably be made of carbon fiber material or metallic material.

The man skilled in the art will be able to manufacture the frame 1 differently than described herein (e.g., by creating hollow frame portions of plastic material, such as polymethylmethacrylate), without however departing from the teachings of the present invention.

In combination with the above, the aircraft may comprise electronic equipment (so-called avionics), which may in turn comprise speed controllers for controlling the speed of the motors, a battery for supplying power to the motors and/or to said electronic equipment, etc.; such electronic equipment is coupled, via constraining means (such as, for example, screws and/or bolts, bi-adhesive tape, or the like), to one of the peripheral portions 12,13 (of the frame 1) which is closer to the position where the video acquisition means 21 can be located. In the accompanying drawings, this portion is the upper peripheral portion 12, because the phone has the video acquisition means 21 positioned in its upper part. It is nevertheless possible to couple said equipment to the lower peripheral portion 13, if the video acquisition means 21 of the mobile device 2 are located near the bottom, e.g., because the mobile device coupled to the frame 1 has a different arrangement of the video acquisition means than shown in the annexed drawings, or because in a particular situation (e.g., when producing creative videos) it is convenient to mount said mobile device upside-down.

The coupling of the electronic equipment to that peripheral portion 12,13 (of the frame 1) which is less distant from the position where the video acquisition means 21 are located moves the center of mass of the aircraft closer to said video acquisition means 21. This advantageously reduces the oscillations/vibrations to which said video acquisition means 21 are subjected while said aircraft is flying.

In a particularly advantageous variant, the electronic equipment described above can be implemented partly or totally by using the hardware already present in the mobile device 2. For example, the battery may be that of the mobile device 2 and/or the computing power for avionics may be provided by the microprocessors contained within the mobile device 2. In this case, the electrical connections between the aircraft motors and the electronics installed on the mobile device 2 can be made using a suitable plugging connector that plugs into the output connector provided on the mobile device 2 and relative lead wiring contained in frame 1. This advantageously prevents weighing down the aircraft with a dedicated battery and/or with avionics electronics provided outside the mobile device 2. Also the gyroscopes and accelerometers necessary to control the flight of the aircraft may be those already provided within the mobile device 2, thus advantageously reducing the aircraft weight. In other words, the mobile device 2 comprises a battery adapted to power said aircraft and/or said mobile device 2 is configured for controlling the flight of said aircraft, for example by generating suitable control signals (directed to the motors or to the motor speed controllers) on the basis of the outputs of the accelerometers and/or gyroscopes incorporated into said mobile device 2. This results in a weight reduction that allows reducing the vibrations generated by the motors, thereby reducing the amplitude of the vibrations/oscillations that affect said video acquisition means 21 of said mobile device 2 during the flight.

Of course, the example described so far may be subject to many variations.

Although this description has tackled some of the possible variants of the invention, it will be apparent to those skilled in the art that other embodiments may also be implemented, wherein some elements may be replaced with other technically equivalent elements. The present invention is not therefore limited to the illustrative examples described herein, since it may be subject to many modifications, improvements or replacements of equivalent parts and elements without departing from the basic inventive idea, as set out in the following claims.

The invention claimed is:

1. A remotely controlled multirotor aircraft for acquiring images, comprising:
   receiving means adapted to receive a direction and/or orientation signal, defining a specific yaw, pitch, or roll orientation, which can be transmitted by an interface device, wherein said direction and/or orientation signal defines a direction in which said aircraft must move and/or be oriented,
   flight control means adapted to control the attitude of said aircraft, and configured for:
      acquiring said direction and/or orientation signal,
      calculating, on the basis of said direction and/or orientation signal, the direction in which said aircraft have to move and/or be oriented,
      generating a control signal adapted to make said aircraft take such an attitude as to make it move and/or be oriented in said defined direction,
      wherein the direction and/or orientation signal comprises an instruction signal that represents a voice command imparted by the user of said aircraft, and wherein the flight control means are configured for running a sequence of instructions that implements a speech recognition algorithm that converts the voice command represented in the instruction signal into a bit string, and for generating the control signals based on said bit string; and
   a frame supporting the receiving means and the flight control means, the frame comprising:
      a central portion comprising a top face and an opposing bottom face each extending between a first end and a spaced apart second end, the top face of the central portion being planar;
      a first peripheral portion to which at least one first motor can be coupled, the first peripheral portion being disposed at the first end of the central portion and outwardly projecting from the top face of the central portion, the first peripheral portion having a front face and an opposing back face, at least one of the front face or the back face of the first peripheral portion being planar and disposed perpendicular to the top face of the central portion; and
      a second peripheral portion to which at least one first motor can be coupled, the second peripheral portion being disposed at the second end of the central portion and outwardly projecting from the bottom face of the central portion, the second peripheral portion having a front face and an opposing back face, at least one of the front face or the back face of the second peripheral portion being planar and disposed perpendicular to the top face of the central portion.

2. The remotely controlled multirotor aircraft according to claim 1, further comprising coupling means for coupling a mobile device to the central portion.

3. The remotely controlled multirotor aircraft according to claim 2, wherein the coupling means comprise a case compatible with the shape of the mobile device.

4. The remotely controlled multirotor aircraft according to claim 2, wherein the coupling means comprise at least one magnet suitable for keeping the mobile device coupled to said central portion.

5. The remotely controlled multirotor aircraft according to claim 2, wherein the coupling means comprise a layer of bi-adhesive gel.

6. The remotely controlled multirotor aircraft according to claim 2, wherein the shape of the frame is such that, when the mobile device is coupled to said frame via the coupling means, the center of mass of the aircraft is located near the central portion of said frame.

7. The remotely controlled multirotor aircraft according to claim 2, comprising the mobile device coupled by means of the coupling means to the central portion of the frame, wherein said mobile device comprises the flight control means.

8. The remotely controlled multirotor aircraft according to claim 7, wherein the mobile device comprises accelerometer and/or gyroscopic means that are in communication with the flight control means.

9. The remotely controlled multirotor aircraft according to claim 1, wherein the flight control means are located on one of the peripheral portions of said frame.

10. The remotely controlled multirotor aircraft according to claim 1, wherein the direction and/or orientation signal defines the direction as a certain static position reached and maintained by the aircraft for a certain period of time.

11. The remotely controlled multirotor aircraft according to claim 1, wherein the first peripheral portion and the second peripheral portion outwardly project in opposite directions from the central portion.

12. The remotely controlled multirotor aircraft according to claim 1, wherein the first peripheral portion and the second peripheral portion are disposed in parallel alignment.

13. The remotely controlled multirotor aircraft according to claim 1, wherein the first peripheral portion comprises a main portion and a pair of spaced apart arms outwardly projecting from the main portion.

14. The remotely controlled multirotor aircraft according to claim 1, wherein the central portion comprises a plate having the top face and the opposing bottom face, the top face and the bottom face of the plate being planar and disposed in parallel alignment.

15. The remotely controlled multirotor aircraft according to claim 14, wherein the front face and back face of the first peripheral portion are both planar and disposed in parallel alignment, the top face of the central portion being disposed perpendicular to the front face and the back face of the first peripheral portion.

16. The remotely controlled multirotor aircraft according to claim 15, wherein the front face and back face of the second peripheral portion are both planar and disposed in parallel alignment, the top face of the central portion being disposed perpendicular to the front face and the back face of the second peripheral portion.

17. The remotely controlled multirotor aircraft according to claim 1, further comprising:
the bottom face of the central portion being planar; and
the front face of the first peripheral portion being planar and disposed perpendicular to the bottom face of the central portion.

18. A remotely controlled multirotor aircraft for acquiring images, comprising:
receiving means adapted to receive a direction and/or orientation signal, defining a specific yaw, pitch, or roll orientation, which can be transmitted by an interface device, wherein said direction and/or orientation signal defines a direction in which said aircraft must move and/or be oriented,
flight control means adapted to control the attitude of said aircraft; and
a frame supporting the receiving means and the flight control means, the frame comprising:
a central portion comprising a top face and an opposing bottom face each extending between a first end and a spaced apart second end, the top face of the central portion being planar;
a first peripheral portion to which at least one first motor can be coupled, the first peripheral portion being disposed at the first end of the central portion and outwardly projecting from the top face of the central portion, the first peripheral portion having a front face and an opposing back face, at least one of the front face or the back face of the first peripheral portion being planar and disposed perpendicular to the top face of the central portion; and
a second peripheral portion to which at least one first motor can be coupled, the second peripheral portion being disposed at the second end of the central portion and outwardly projecting from the bottom face of the central portion, the second peripheral portion having a front face and an opposing back face, at least one of the front face or the back face of the second peripheral portion being planar and disposed perpendicular to the top face of the central portion.

* * * * *